United States Patent
Yoshizawa

(10) Patent No.: US 12,096,057 B2
(45) Date of Patent: *Sep. 17, 2024

(54) VIDEO DISPLAY SYSTEM, VIDEO DISPLAY DEVICE, CONTENTS SERVER, VIDEO DISPLAY METHOD, AND VIDEO DISPLAY PROGRAM

(71) Applicant: Maxell, Ltd., Kyoto (JP)

(72) Inventor: Kazuhiko Yoshizawa, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,227

(22) Filed: May 15, 2023

(65) Prior Publication Data

US 2023/0283823 A1 Sep. 7, 2023

Related U.S. Application Data

(63) Continuation of application No. 16/423,416, filed on May 28, 2019, now Pat. No. 11,729,446, which is a
(Continued)

(30) Foreign Application Priority Data

Feb. 18, 2013 (JP) .................................. 2013-028550

(51) Int. Cl.
*H04N 21/258* (2011.01)
*G06Q 30/0241* (2023.01)
(Continued)

(52) U.S. Cl.
CPC ... *H04N 21/25866* (2013.01); *G06Q 30/0241* (2013.01); *H04N 5/76* (2013.01);
(Continued)

(58) Field of Classification Search
CPC ......... H04N 21/25866; H04N 21/4325; H04N 21/44106; H04N 21/4622; H04N 21/6543;
(Continued)

(56) References Cited

U.S. PATENT DOCUMENTS 8,589,968 B2 11/2013 Alberth
9,037,482 B2 * 5/2015 Huntington ........ G06Q 30/0269
705/14.43
(Continued)

FOREIGN PATENT DOCUMENTS

JP 2001-103384 A 4/2001
JP 2005-156996 A 6/2005
(Continued)

OTHER PUBLICATIONS

International Search Report of PCT/JP2014/051442.

*Primary Examiner* — Mulugeta Mengesha
(74) *Attorney, Agent, or Firm* — Mattingly & Malur, PC

(57) ABSTRACT

In a system configured to enable mutual communications between a contents server and a video display device, the contents server is configured to accumulate a plurality of video contents, receive operator analysis information transmitted from the video display device, select at least one video content from the plurality of accumulated video contents based on the operator analysis information received by an operator information receiving unit, and transmit the selected content to the video display device. The video display device is configured to receive a digital broadcast wave, select a digital broadcast program, acquire the operator analysis information of the video display device, transmit the acquired operator analysis information to the contents server, receive the video content transmitted from the contents server, and select and display one of the digital
(Continued)

| OPERATOR ANALYSIS RESULT | VIDEO PART 3 | VIDEO PART 5 |
|---|---|---|
| NUMBER OF TIMES OF VIEWS IN PAST: 0 | COMMON PART 3<br>IS SELECTED | COMMON PART 5<br>IS SELECTED |
| NUMBER OF TIMES OF VIEWS IN PAST 1 | MALE-ORIENTED PART 3<br>IS SELECTED | MALE-ORIENTED PART 5<br>IS SELECTED |
| NUMBER OF TIMES OF VIEWS IN PAST 2 | FEMALE-ORIENTED PART 3<br>IS SELECTED | FEMALE-ORIENTED PART 5<br>IS SELECTED | broadcast program selected by a digital broadcast program selector and the video content received by a video contents receiving unit.

2 Claims, 13 Drawing Sheets

Related U.S. Application Data continuation of application No. 14/652,530, filed as application No. PCT/JP2014/051442 on Jan. 24, 2014, now abandoned.

(51) Int. Cl.
| | |
|---|---|
| H04N 5/76 | (2006.01) |
| H04N 21/432 | (2011.01) |
| H04N 21/44 | (2011.01) |
| H04N 21/462 | (2011.01) |
| H04N 21/6543 | (2011.01) |
| H04N 21/658 | (2011.01) |
| H04N 21/81 | (2011.01) |

(52) U.S. Cl.
CPC ... *H04N 21/4325* (2013.01); *H04N 21/44016* (2013.01); *H04N 21/4622* (2013.01); *H04N 21/6543* (2013.01); *H04N 21/6582* (2013.01); *H04N 21/812* (2013.01)

(58) Field of Classification Search
CPC .... H04N 21/6582; H04N 21/812; H04N 5/76; G06Q 30/0241
See application file for complete search history.

(56) References Cited

U.S. PATENT DOCUMENTS

| | | | |
|---|---|---|---|
| 9,219,790 B1* | 12/2015 | Filev | H04L 67/535 |
| 2003/0088832 A1 | 5/2003 | Agostinelli | |
| 2003/0172378 A1 | 9/2003 | Lalitha | |
| 2004/0158858 A1 | 8/2004 | Paxton | |
| 2005/0114214 A1* | 5/2005 | Itoh | H04N 5/76 |
| | | | 348/E7.071 |
| 2006/0184800 A1 | 8/2006 | Rosenberg | |
| 2007/0261079 A1 | 11/2007 | Pack | |
| 2008/0040742 A1* | 2/2008 | Howcroft | H04N 21/6582 |
| | | | 725/35 |
| 2008/0155582 A1 | 6/2008 | Sokola | |
| 2008/0235090 A1 | 9/2008 | Lundstrom | |
| 2009/0044246 A1* | 2/2009 | Sheehan | H04N 21/235 |
| | | | 725/146 |
| 2009/0133051 A1 | 5/2009 | Hildreth | |
| 2009/0138805 A1 | 5/2009 | Hildreth | |
| 2009/0298514 A1 | 12/2009 | Ullah | |
| 2010/0242065 A1* | 9/2010 | Murakami | G06Q 10/00 |
| | | | 725/34 |
| 2011/0173662 A1 | 7/2011 | Beppu | |
| 2011/0225270 A1 | 9/2011 | Taniguchi et al. | |
| 2012/0116883 A1 | 5/2012 | Asam | |
| 2013/0263182 A1 | 10/2013 | Ivy | |

FOREIGN PATENT DOCUMENTS

| | | |
|---|---|---|
| JP | 2008-263458 A | 10/2008 |
| JP | 2009-152810 A | 7/2009 |
| JP | 2010-500646 A | 1/2010 |
| JP | 2011-504710 A | 2/2011 |

* cited by examiner

| AGE ESTIMATION IN OPERATOR ANALYZING PROCESS | | |
|---|---|---|
| WHICH RANGE OF | ~09 | DOES OPERATOR BELONG TO? |
| | 10~19 | |
| | 20~29 | |
| | 30~39 | |
| | 40~49 | |
| | 50~59 | |
| | 60~69 | |
| | 70~ | |

FIG. 12

```
┌─ PROGRAM INFORMATION OF DIGITAL BROADCAST PROGRAM ─┐
│                                                     │
│  PROGRAM NAME: ○○○○○○                              │
│  BROADCAST TIME: 21:00 TO 21:54                    │
│         ⋮                                           │
│  VIDEO REPLACEMENT: AVAILABLE                       │
│  REPLACEABLE VIDEO PARTS:    ①CM2  21:13~21:14     │
│                              ②CM3  21:26~21:27     │
│                              ③CM4  21:39~21:40     │
│                                                     │
│                                                     │
│  VIDEO SERVER URL. http://△△△△△△△△/               │
│                                                     │
└─────────────────────────────────────────────────────┘
```

| CAR MODEL | TARGET | | | CM TYPE |
|---|---|---|---|---|
| | MALE | FEMALE | AGE GROUP | |
| SEDAN TYPE A | ○ | ○ | 50~ | CM SE A |
| SEDAN TYPE B | ○ | ○ | 40~60 | CM SE B |
| SEDAN TYPE C | ○ | ○ | ~40 | CM SE C |
| SPORTS CAR A | ○ | ○ | 30~50 | CM SP A |
| SPORTS CAR B | ○ | - | ~30 | CM SP B |
| SPORTS CAR C | - | ○ | ~30 | CM SP C |
| VAN | ○ | ○ | ALL AGES | CM VA |
| COMPACT CAR A | ○ | - | ~40 | CM CO A |
| COMPACT CAR B | - | ○ | ~40 | CM CO B |
| COMPACT CAR C | ○ | ○ | ALL AGES | CM CO C |
| COMPANY IMAGE | ○ | ○ | ALL AGES | CM COMPANY |

FIG. 15

| OPERATOR ANALYSIS RESULT | | | CM6 | CM7 | CM8 |
|---|---|---|---|---|---|
| A 400a | ESTIMATION RESULT | | CM SE B | CM SP A | CM VA |
| | GENDER | MALE | | | |
| | AGE | 40~49 | IS SELECTED | IS SELECTED | IS SELECTED |
| B 400b | ESTIMATION RESULT | | CM SE C | CM VA | CM CO B |
| | GENDER | FEMALE | | | |
| | AGE | 30~39 | IS SELECTED | IS SELECTED | IS SELECTED |
| C 400c | ESTIMATION RESULT | | CM SP B | CM CO A | CM CO C |
| | GENDER | MALE | | | |
| | AGE | 20~29 | IS SELECTED | IS SELECTED | IS SELECTED |
| D 400d | ESTIMATION RESULT | | CM SP C | CM CO B | CM CO C |
| | GENDER | FEMALE | | | |
| | AGE | 10~19 | IS SELECTED | IS SELECTED | IS SELECTED |
| A B C D 400a/0b/0c/0d | | | CM VA | CM CO C | CM COMPANY |
| | | | IS SELECTED | IS SELECTED | IS SELECTED |

| OPERATOR ANALYSIS RESULT | VIDEO PART 3 | VIDEO PART 5 |
|---|---|---|
| NUMBER OF TIMES OF VIEWS IN PAST: 0 | COMMON PART 3<br>IS SELECTED | COMMON PART 5<br>IS SELECTED |
| NUMBER OF TIMES OF VIEWS IN PAST 1 | MALE-ORIENTED PART 3<br>IS SELECTED | MALE-ORIENTED PART 5<br>IS SELECTED |
| NUMBER OF TIMES OF VIEWS IN PAST 2 | FEMALE-ORIENTED PART 3<br>IS SELECTED | FEMALE-ORIENTED PART 5<br>IS SELECTED |

… continued …

VIDEO DISPLAY SYSTEM, VIDEO DISPLAY DEVICE, CONTENTS SERVER, VIDEO DISPLAY METHOD, AND VIDEO DISPLAY PROGRAM

TECHNICAL FIELD

The present invention relates to a video display technique.

BACKGROUND ART

In the case of video contents such as digital broadcasting which viewers can view for free, the production cost thereof is often paid by the advertisement and promotion expense of sponsor companies which desire to advertise their products. Therefore, free video contents are generally accompanied by commercial (Commercial Message: hereinafter, referred to as CM) videos of the sponsor companies. Also, the sponsor companies expect that high advertising effects are obtained by the CM videos.

On the other hand, recently, recording/reproducing devices such as HDD (Hard Disk Drive) recorders have been sufficiently widespread, and the style of once recording a digital broadcast program by a recording/reproducing device without viewing it in real time and viewing it at a future date has also become general. When viewing a digital broadcast program by the style like this, it is conceivable that the CM videos accompanying the video contents miss the timing of advertisement and promotion, and sufficient advertisement effects cannot be obtained. As a technique for improving the above-described situation, a technique described in Patent Document 1 below has been known.

Patent Document 1 describes a technique relating to "a recording/reproducing device having: a recording unit capable of recording a TV program including CM; a reproducing unit; a CM acquiring unit which acquires CM different from the CM included in the program to be reproduced; and a control unit which controls the reproducing unit so that the CM included in the program is replaced by the CM acquired by the CM acquiring unit at the reproduction of the program", and this technique makes it possible to provide the latest CM videos to the viewer when the digital broadcast program recorded in the recording/reproducing device is reproduced.

RELATED ART DOCUMENT

Patent Document

Patent Document 1: Japanese Patent Application Laid-Open Publication No. 2009-152810

SUMMARY OF THE INVENTION

Problems to be Solved by the Invention

The number of products which a sponsor company desires to advertise is not always one. For example, a car manufacturer produces various car models such as sedans, sports cars and compact cars, and will prepare CM videos targeting different customer types respectively for the car models. Moreover, in order to effectively carry out advertisement by the CM videos, it is desirable that the CM videos are reliably presented to the viewers corresponding to the targeted customer types. More specifically, if it is possible to identify the customer type to which the viewer who views the video contents belongs and to provide the CM videos, which have been selected based on the identification information, to the viewer together with the video contents, preferred advertisement effects can be expected.

However, in a current digital broadcasting system, broadcasting stations just distribute video contents and CM videos in accordance with schedules determined in advance regardless of the types of the viewers. Patent Document 1 mentioned above also does not disclose any technique that realizes the above-described process.

Also, not only in the example of the CM videos described above, but also in dramas and others, for example, if the process of selecting a part of a story of video contents based on the information whether the viewer is a male or a female so that a story from the viewpoint of males is provided when the viewer is a male and a story from the viewpoint of females is provided when the viewer is a female is carried out, the viewers will be able to enjoy the distributed dramas more.

The present invention has been made in view of the above-described issue, and an object thereof is to carry out selection and display of video contents more suitably.

Means for Solving the Problems

For the solution of the issue mentioned above, for example, an embodiment of the present invention is a video display system configured to enable mutual communications between a contents server and a video display device via a network, the contents server includes: a video contents accumulating unit which accumulates a plurality of video contents; an operator information receiving unit which receives operator analysis information transmitted from the video display device; and a video contents transmitting unit which selects at least one video content from the plurality of video contents accumulated in the video contents accumulating unit based on the operator analysis information received by the operator information receiving unit, and transmits the selected video content to the video display device, and the video display device includes: a digital broadcast program selecting unit which receives a digital broadcast wave and selects a digital broadcast program from the received digital broadcast wave; an operator information acquiring unit which acquires the operator analysis information of the video display device; an operator information transmitting unit which transmits the operator analysis information acquired by the operator information acquiring unit to the contents server; a video contents receiving unit which receives the video content transmitted from the contents server; and a display unit which selects and displays one of the digital broadcast program selected by the digital broadcast program selecting unit and the video content received by the video contents receiving unit.

Effects of the Invention

According to the present invention, selection and display of video contents can be more suitably carried out.

BRIEF DESCRIPTIONS OF THE DRAWINGS

FIG. 12 is a conceptual diagram for describing program information of a digital broadcast program;

FIG. 15 is a conceptual diagram for describing a video selection result obtained by the video contents selecting process carried out in accordance with the result of the operator analyzing process;

DETAILED DESCRIPTION OF PREFERRED EMBODIMENTS

Hereinafter, examples of embodiments of the present invention will be described with reference to drawings.

First Embodiment

Figure 1:
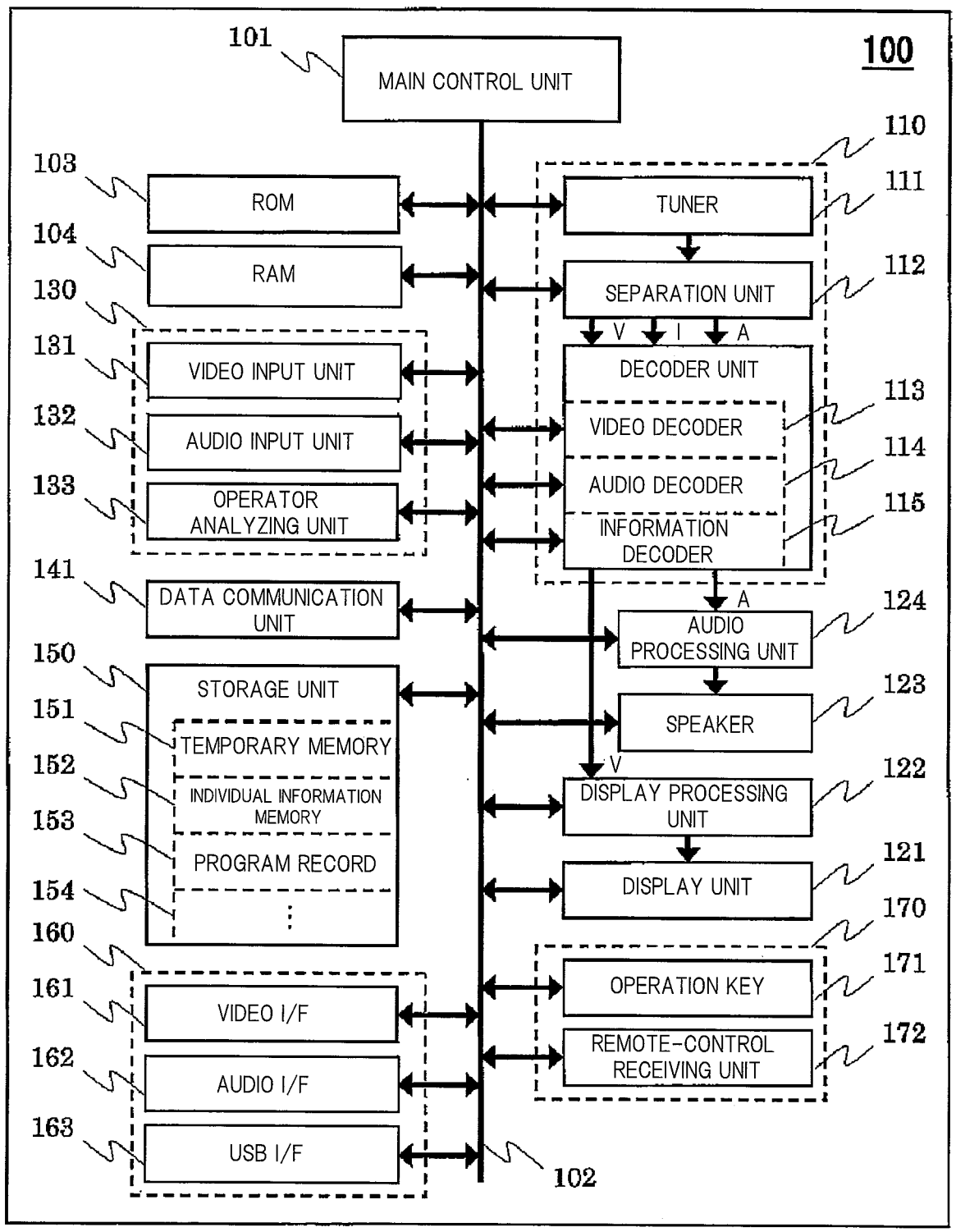
FIG. 1 is a block diagram of a video display device.

FIG. 1 is a block diagram of a video display device of the present embodiment. A video display device 100 is made up of a main control unit 101, a system bus 102, a ROM 103, a RAM 104, a broadcast receiving unit 110, a display unit 121, a display processing unit 122, a speaker 123, an audio processing unit 124, an operator information acquiring unit 130, an operator communication unit 141, a storage unit 150, an external interface 160 and an operation unit 170.

Figure 2:
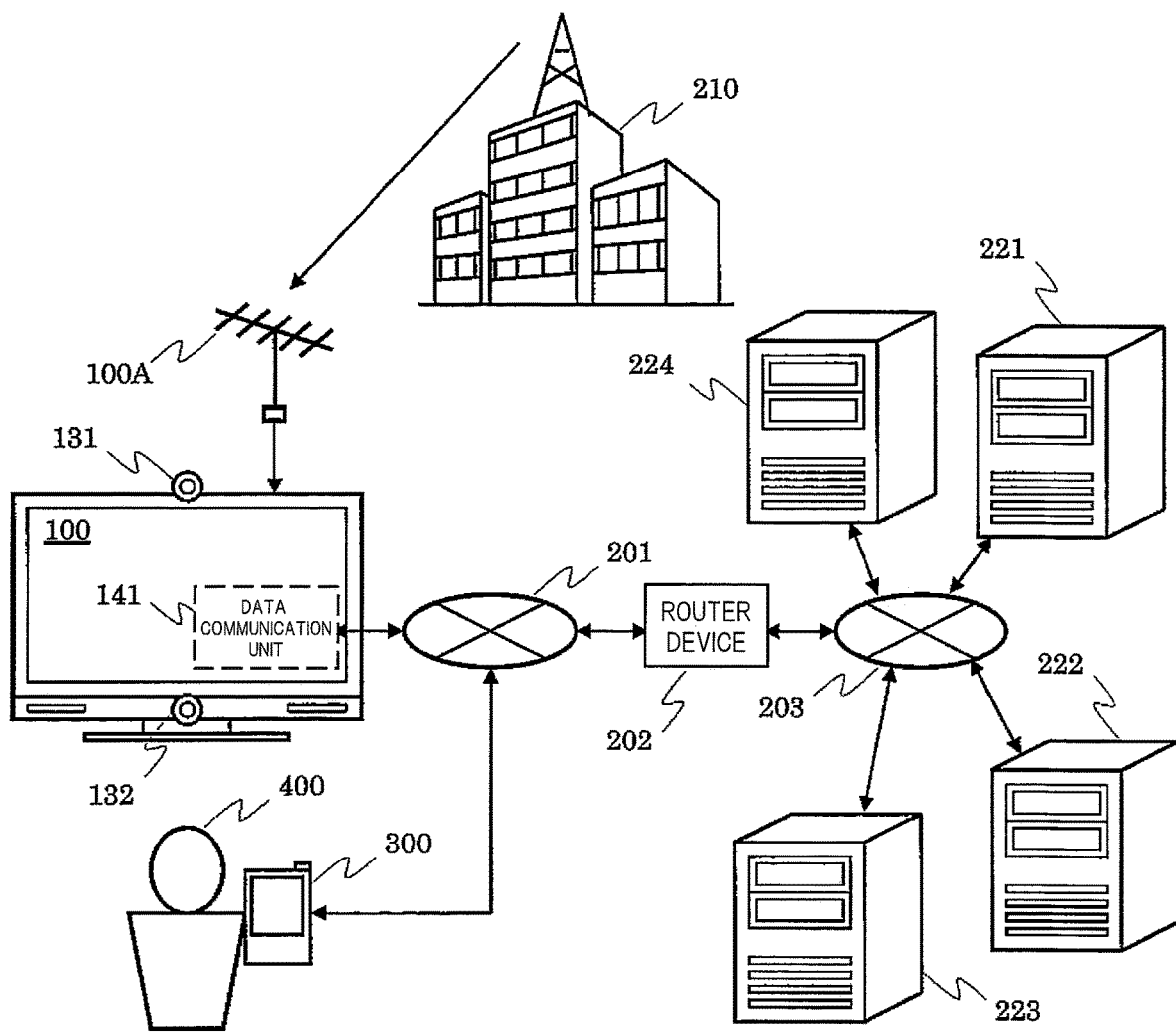
FIG. 2 is a configuration diagram of a video display system.

FIG. 2 is a configuration diagram of a video display system including the video display device 100 of the present embodiment. The video display system is made up of the video display device 100, an antenna 100A, a LAN 201, a router device 202, a WAN 203, a broadcasting station 210, an application server 221, a CM server 222, a contents server 223, an operator analyzing server 224 and a mobile information terminal 300. A person 400 is a viewer (operator) who views video contents by the video display device 100.

Figure 3:
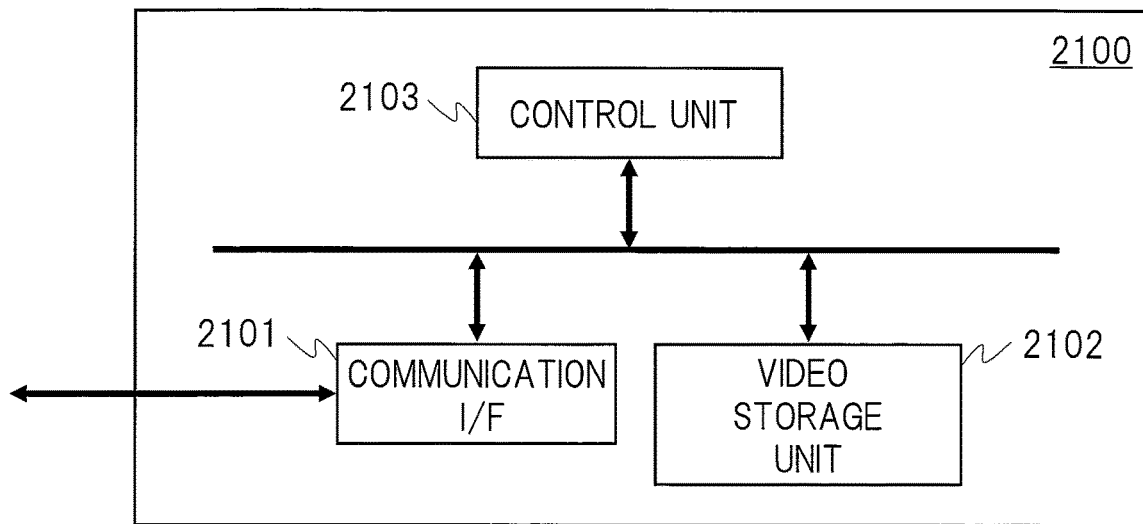
FIG. 3 is a block diagram of a CM server and a contents server.

For example, the CM server 222 and the contents server 223 can be formed like a server 2100 shown in FIG. 3. The server 2100 is provided with, for example, a communication I/F 2101, a video storage unit 2102, a control unit 2103 and others. The communication I/F 2101 is connected to a network and can transmit/receive information to/from other equipment via the network. Video data can be accumulated in the video storage unit 2102. If it is the CM server 222, a plurality of CM videos are accumulated in the video storage unit 2102. If it is the contents server 223, a plurality of video contents are accumulated in the video storage unit 2102. The control unit 2103 interprets the information from the other equipment received via the communication I/F 2101, and controls the video storage unit 2102 and the communication I/F 2101 so as to select necessary video data from the plurality of video data accumulated in the video storage unit 2102 and output the data via the communication I/F 2101.

The video display device 100 may be a TV device with a recording function in which a recording/reproducing function of digital broadcast programs is incorporated or may be a recording-enabled TV device which does not incorporate the recording/reproducing function but can cause an externally-connected HDD device or the like to record/reproduce digital broadcast programs. Alternatively, the video display device 100 may be an Internet-enabled TV device which can display the video contents accumulated by a contents server connected on a network such as the Internet. Also, the video display device 100 may be a mobile phone, a smartphone, a tablet terminal, a stationary or portable PC (Personal Computer), a digital camera, a mobile game machine and others having a digital broadcast receiving function and a function to record/reproduce received digital broadcast programs. In addition, the video display device 100 may be a mobile phone, a smartphone, a tablet terminal, a stationary or portable PC, a digital camera, a mobile game machine and others which can display the video contents accumulated by a contents server connected on a network such as the Internet. Furthermore, the video display device 100 may be a combination of a recording/reproducing device such as a HDD recorder or a BD (Blu-ray (registered trademark) Disc) recorder and a monitor device, and it may be a combination of a STB (Set Top Box) or a stationary game machine, which can receive digital broadcast programs and/or the video contents accumulated by a contents server connected on a network such as the Internet, and a monitor device.

Hereinafter, the configuration of the video display device 100 will be described in detail with reference to FIG. 1.

The main control unit 101 is a microprocessor unit, which controls the entire video display device 100 in accordance with predetermined programs. The system bus 102 is a data communication path for data transmission/reception between the main control unit 101 and the respective units in the video display device 100. The ROM (Read Only Memory) 103 is a memory in which basic operation programs of the video display device 100 such as an operating system and predetermined application programs are stored, and for example, a rewritable ROM such as an EEPROM (Electrically Erasable Programmable ROM) or a flash ROM is used for the ROM 103. The version upgrade of basic operation programs and function enhancement can be achieved by updating the programs stored in the ROM 103. The ROM 103 may use a part of a memory region in the storage unit 150 described later instead of employing the independent configuration shown in FIG. 1. The RAM (Random Access Memory) 104 serves as a work area in the case of executing the basic operation programs or applications. Also, the ROM 103 and the RAM 104 may be integrally configured with the main control unit 101.

The broadcast receiving unit 110 receives digital broadcast waves and carries out signal processing such as decoding. Particularly, a tuner 111 extracts the signals of a channel, which has been selected by an operator of the video display device 100, from the broadcast waves received by the antenna 100A and demodulates TS (Transport Stream) signals. A separation unit 112 separates the TS signals into packetized video data, audio data and accompanying information data, and then outputs the video data to a video decoder 113, outputs the audio data to an audio decoder 114, and outputs the accompanying information data to an information decoder 115. The video decoder 113 decodes the video data which has been output from the separation unit 112, and outputs the data as video signals to the display processing unit 122. The audio decoder 114 decodes the audio data which has been output from the separation unit 112, and outputs the data as audio signals to the audio processing unit 124. The information decoder 115 processes the accompanying information data which has been output from the separation unit 112, and particularly acquires SI (Service Information) and others including program information such as program names, genres and broadcast start/end time and date.

The display unit 121 is a display device such as a liquid crystal panel, and it provides the video signals, which have been processed by the display processing unit 122, to the operator of the video display device 100. Moreover, the display processing unit 122 carries out format conversion, superimposing process of menus and other OSD (On Screen Display) signals and others to the input video signals in accordance with needs. The speaker 123 provides the audio signals, which have been processed by the audio processing unit 124, to the operator of the video display device 100.

The operator information acquiring unit 130 is made up of a video input unit 131, an audio input unit 132 and an operator analyzing unit 133, and acquires information about the operator of the video display device 100 via the video input unit 131, the audio input unit 132 and others. The video input unit 131 is a camera which inputs image data of surroundings and an object by converting the light input through a lens into electrical signals. The video input unit 131 may be incorporated and integrally configured with the video display device 100 or may be a separated camera connected to a USB interface described later or the like. The audio input unit 132 is a microphone and inputs audio data such as the voice of the operator. The audio input unit 132 may be incorporated and integrally configured with the video display device 100 or may be a separated microphone connected to a USB interface described later or the like.

The operator analyzing unit 133 carries out a process of estimating or confirming the gender, age and others of the operator of the video display device 100 (hereinafter, referred to as an operator analyzing process) by subjecting a face image input from the video input unit 131 or a voice input from the audio input unit 132 to digital signal processing or by another method. Although the operator analyzing unit 133 is illustrated as an independent configuration in FIG. 1, the main control unit 101 may operate to realize this function while using the RAM 104 as a work area.

The data communication unit 141 is connected to a network such as the Internet by wire communication or wireless communication to transmit/receive data. It may be connected to a mobile telephone communication network to transmit/receive data, and may have both of the above-described functions. The data communication unit 141 is configured to have an encoding circuit, a decoding circuit and others.

The storage unit 150 is used to store operation set values of the video display device 100, the information of the operator of the video display device 100 and various applications operated in the video display device 100, and is further used to record digital broadcast programs and others. The storage unit 150 is made up of a contents temporary memory region 151 which temporarily stores the video contents received via the data communication unit 141, an individual information memory region 152 which stores the information about the operator of the video display device 100 and others, a program memory region 153 which records digital broadcast programs and stores the information (reservation information and the like) relating to the recording of the digital broadcast programs, and an other information memory region 154. The storage unit 150 has to retain the stored information even in a state in which power is not supplied to the video display device 100. Therefore, the storage unit 150 employs a device such as a flash ROM, a SSD (Solid State Drive) or a HDD.

All or part of the functions of the ROM 103 may be replaced by a part of the region of the other information memory region 154. Also, it is presupposed that the video display device 100 can enhance functions by downloading new applications from the application server 221 via the WAN (Wide Area Network) 203, the router device 202 and the LAN (Local Area Network) 201. At this time, the downloaded new applications are stored in the other information memory region 154. When the new applications stored in the other information memory region 154 are expanded on the RAM 104 and executed, the video display device 100 can realize many types of new functions.

The WAN 203 is a wide area network such as the Internet, and the LAN 201 is a narrow area network formed in, for example, a home. The WAN 203 and the LAN 201 are connected to each other by the router device 202 and can carry out data communication alternately.

The external interface 160 is a group of interfaces for enhancing the functions of the video display device 100, and is made up of a video interface 161, an audio interface 162 and a USB (Universal Serial Bus) interface 163 in the present embodiment. The video interface 161 and the audio interface 162 carry out the input of video signal/audio signal from external video/audio output device and the output of video signal/audio signal to external video/audio input device. If the video display device 100 is a HDD recorder, a BD recorder, a STB or the like, a monitor device is suitably connected to the video interface 161 and the audio interface 162. The USB interface 163 is used to connect, for example, USB devices such as a keyboard or memory cards. If the video display device 100 does not incorporate a recording/reproducing function and records digital broadcast programs in an externally connected HDD device or the like, the HDD device or the like is suitably connected to the USB interface 163.

The operation unit 170 is an instruction input unit with which operation instructions to the video display device 100 are input, and it is made up of an operation key 171 in which button switches are arranged and a remote-control receiving unit 172 which receives infrared-ray signals from a remote controller (not shown) in the present embodiment. The video display device 100 may be operated by using a touch panel disposed in an overlapped manner on the display unit 121 instead of the operation key 171. The operation unit 170 may use both of them in combination. The video display device 100 may be operated by using, for example, a keyboard connected to the USB interface 163. The video display device 100 may be operated by using, for example, the mobile information terminal 300 or another PC connected via the data communication unit 141.

The configuration example of the video display device 100 shown in FIG. 1 includes configurations such as the external interface 160 which are not essential to the present invention, and the effects of the present invention are not impaired even without them. The configuration further including a mail processing unit, an acceleration sensor, a gyro sensor, a geomagnetic sensor, a GPS (Global Positioning System) receiving unit and others may be employed.

The video display device 100 of the present embodiment has a function to select and display the video contents in accordance with the result of the operator analyzing process by the operator analyzing unit 133. First, the operator analyzing process will be described below.

Figure 4:
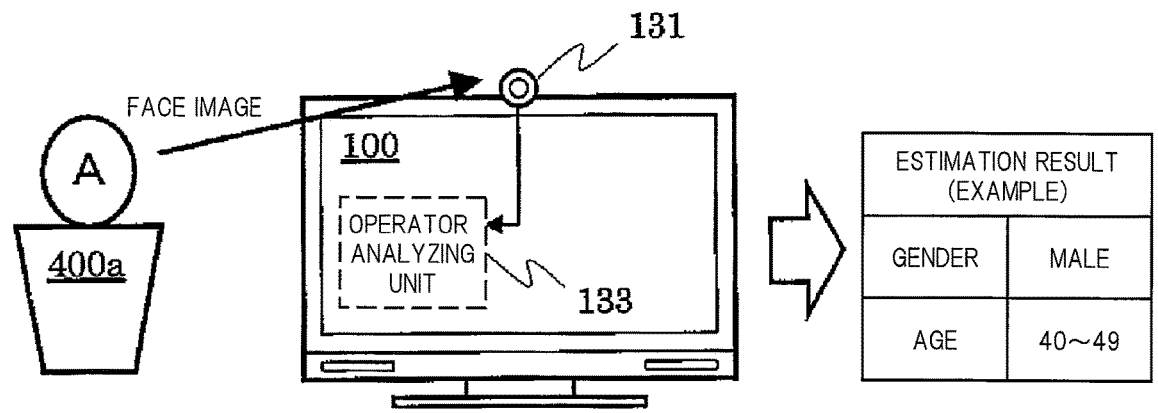
FIG. 4 is a conceptual diagram for describing an operator analyzing process using a face image.

FIG. 4 is a diagram for describing an example of the case in which the operator analyzing process is carried out by using the face image of the operator input from the video input unit 131.

As shown in FIG. 4, when a person A (400*a*) is a viewer (operator) of the video display device 100, first, the video input unit 131 inputs an image of the person A (400*a*) who views the video display device 100. Furthermore, the operator analyzing unit 133 carries out the operator analyzing process of extracting a face image of the person A (400*a*) from the input image and estimating the gender and age of the person A (400*a*) who views the video display device 100 based on the extracted face image. If there are a plurality of people who view the video display device 100, the operator analyzing process of estimating the gender and age of the person based on the face image is carried out for each of the plurality of people.

Figure 5:
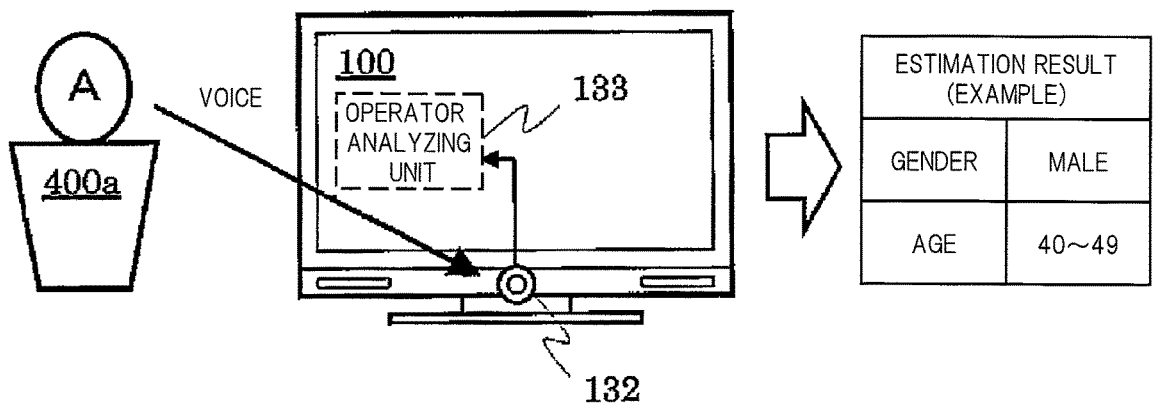
FIG. 5 is a conceptual diagram for describing an operator analyzing process using voice data.

Also, FIG. 5 is a diagram for describing an example of the case in which the operator analyzing process is carried out by using a voice of the operator input from the audio input unit 132.

As shown in FIG. 5, when the person A (400*a*) is a viewer (operator) of the video display device 100, first, the audio input unit 132 inputs a voice emitted by the person A (400*a*) who views the video display device 100, and carries out digital sampling. Furthermore, the operator analyzing unit 133 carries out the operator analyzing process of estimating the gender and age of the person A (400*a*) who views the video display device 100 based on the digitally-sampled voice data. If there are a plurality of people who view the video display device 100, the operator analyzing process of estimating the gender and age of the person based on the voice is carried out for each of the plurality of people.

Figure 6:
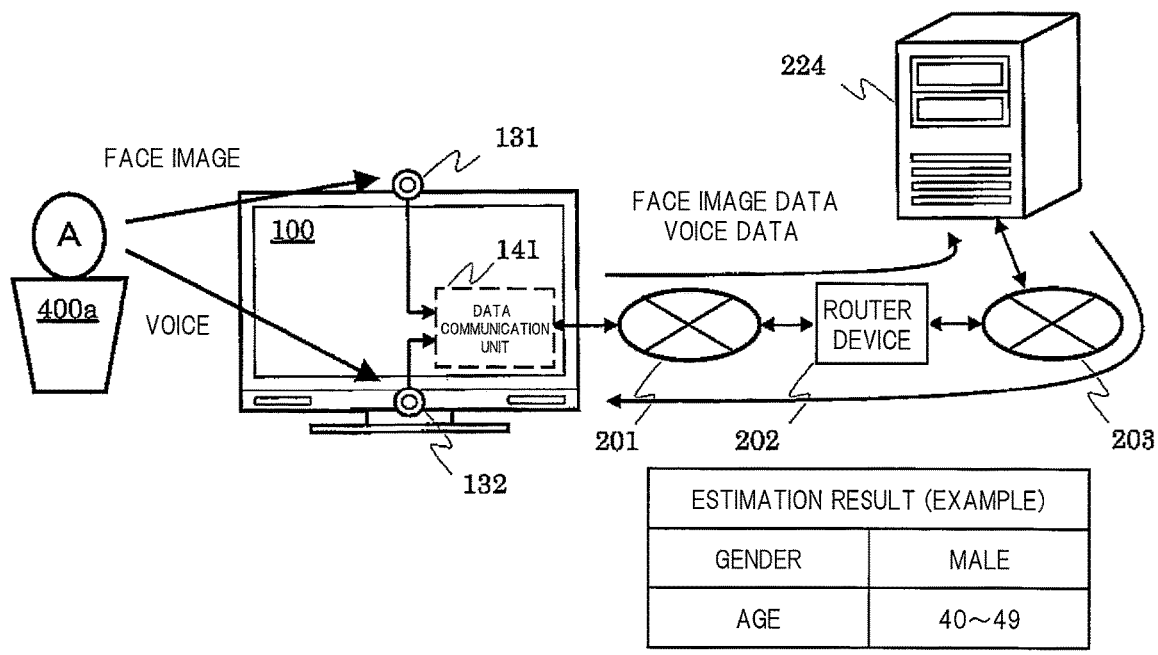
FIG. 6 is a conceptual diagram for describing a process in the case in which an operator analyzing server carries out an operator analyzing process instead of an operator analyzing unit.

In the examples of FIG. 4 and FIG. 5, the operator analyzing process of estimating the gender and age of the person A (400*a*) who views the video display device 100 is carried out by the operator analyzing unit 133. Meanwhile, as another configuration example, as shown in FIG. 6, the data of a face image of the person A (400*a*) input from the video input unit 131 or a voice of the person A (400*a*) input from the audio input unit 132 may be transmitted to the operator analyzing server 224 via the data communication unit 141 and others so as to acquire an estimation result of the gender and age of the person A (400*a*) returned from the operator analyzing server 224 based on the transmitted data. More specifically, the operator analyzing process is carried out by the operator analyzing server 224 instead of the operator analyzing unit 133 unlike the examples of FIG. 4 and FIG. 5. As a result of this, the load relating to the operator analyzing process in the video display device 100 can be reduced.

Figures 7, 8:
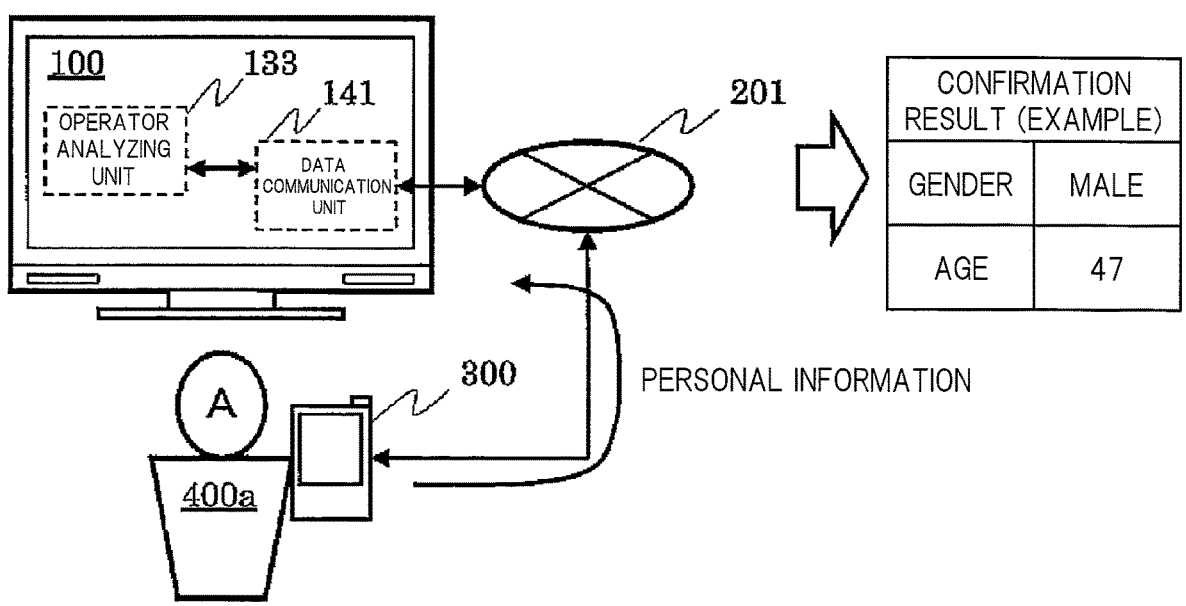
FIG. 7 is a conceptual diagram for describing an age estimating process in the operator analyzing process.
FIG. 8 is a conceptual diagram for describing an operator analyzing process by communication with a mobile information terminal.

In the operator analyzing process, the gender and age of the person who views the video display device 100 are estimated based on the data of a face image or voice. Particularly in the process of estimating the age, however, the estimation result may have a margin to some degree. For example, as shown in FIG. 7, the possible age of the person who views the video display device 100 is divided into the ranges of every 10 years, and the age range to which the age of the person belongs is estimated. The age range is not limited to the above-described example of every 10 years, but may be divided into the ranges of every 5 years, every 1 year and others.

As the method of estimating the gender and age of the person based on the face image and the method of estimating the gender and age of the person based on the voice in the operator analyzing process, publicly-known existing techniques may be used. Therefore, detailed descriptions thereof are omitted.

FIG. 8 is a drawing for describing the case in which the operator analyzing process is carried out by communication with a mobile information terminal such as a mobile phone owned by the operator as a further different configuration example.

As shown in FIG. 8, when the person A (400*a*) is a viewer (operator) of the video display device 100, first, the operator analyzing unit 133 requests the mobile information terminal 300, which is owned by the person A (400*a*), to transmit personal information via the data communication unit 141 and others. If the mobile information terminal 300 stores the personal information of the owner in an internal memory (not shown) and is in a state of being able to transmit the personal information to outside, the mobile information terminal 300 transmits the personal information to the video display device 100 in response to the request transmitted from the video display device 100. The operator analyzing unit 133 carries out the operator analyzing process of confirming the gender and age of the person A (400*a*) who views the video display device 100 by analyzing the personal information which has been transmitted from the mobile information terminal 300.

The personal information is, for example, a profile of himself/herself input to the mobile information terminal 300 by the person A (400*a*) and gender and age are described as the personal information. In addition, contact information such as a phone number and an address may be described. The operator analyzing unit 133 carries out the operator analyzing process by referencing the gender and age of the person A (400*a*) who is the owner of the mobile information terminal 300 described in the personal information. Even if the gender and age are not described in the profile stored in the mobile information terminal 300, for example, if a face picture has been registered, the operator analyzing process of estimating the gender and age of the person A (400*a*) who views the video display device 100 based on the face image can be carried out in the same manner as the example described with reference to FIG. 4. Also, if a history indicating that the person A (400*a*) has accessed an SNS (Social Networking Service) or the like is left in the mobile information terminal 300, the profile of the person A (400*a*) stored in an SNS server may be acquired by accessing the SNS server (not shown) based on the history.

Here, the "state of being able to transmit the personal information to outside" means the state in which the process of requesting transmission of the personal information is confirmed to be valid. For example, this is a state in which a dedicated application for utilizing the mobile information terminal 300 as a remote controller of the video display device 100 is operated and an authentication process has been completed between the mobile information terminal 300 and the video display device 100. Alternatively, the request and transmission of the personal information may be carried out only when the distance between the mobile information terminal 300 and the video display device 100 is determined to be a predetermined value or less by using proximity wireless communication technologies or the like.

The various operator analyzing processes described above may be constantly carried out during the operation of the video display device 100. The operator analyzing process may be carried out at every predetermined interval in consideration of, for example, reduction of power consumption. Also, the operator analyzing process may be carried out only at predetermined timing (for example, when power is on, when returned from a sleep state, when communication between the video display device 100 and the mobile information terminal 300 is established, at every segment of digital broadcast program, and when a channel is changed).

In the foregoing, various examples of the operator analyzing process have been described with reference to the drawings. Each of the methods of the operator analyzing process described by these examples is not limited to be singularly used, and the plurality of the methods may be used in combination. Also, as long as operator analysis can be carried out, methods different from the above-described examples may be used. As the different methods of the operator analyzing process, for example, a method of making a viewer (operator) input a profile when turning on the power of the video display device 100, a method of acquiring personal information by accessing a database which collectively manages personal information based on public personal identification numbers and the like are applicable.

Figure 9:
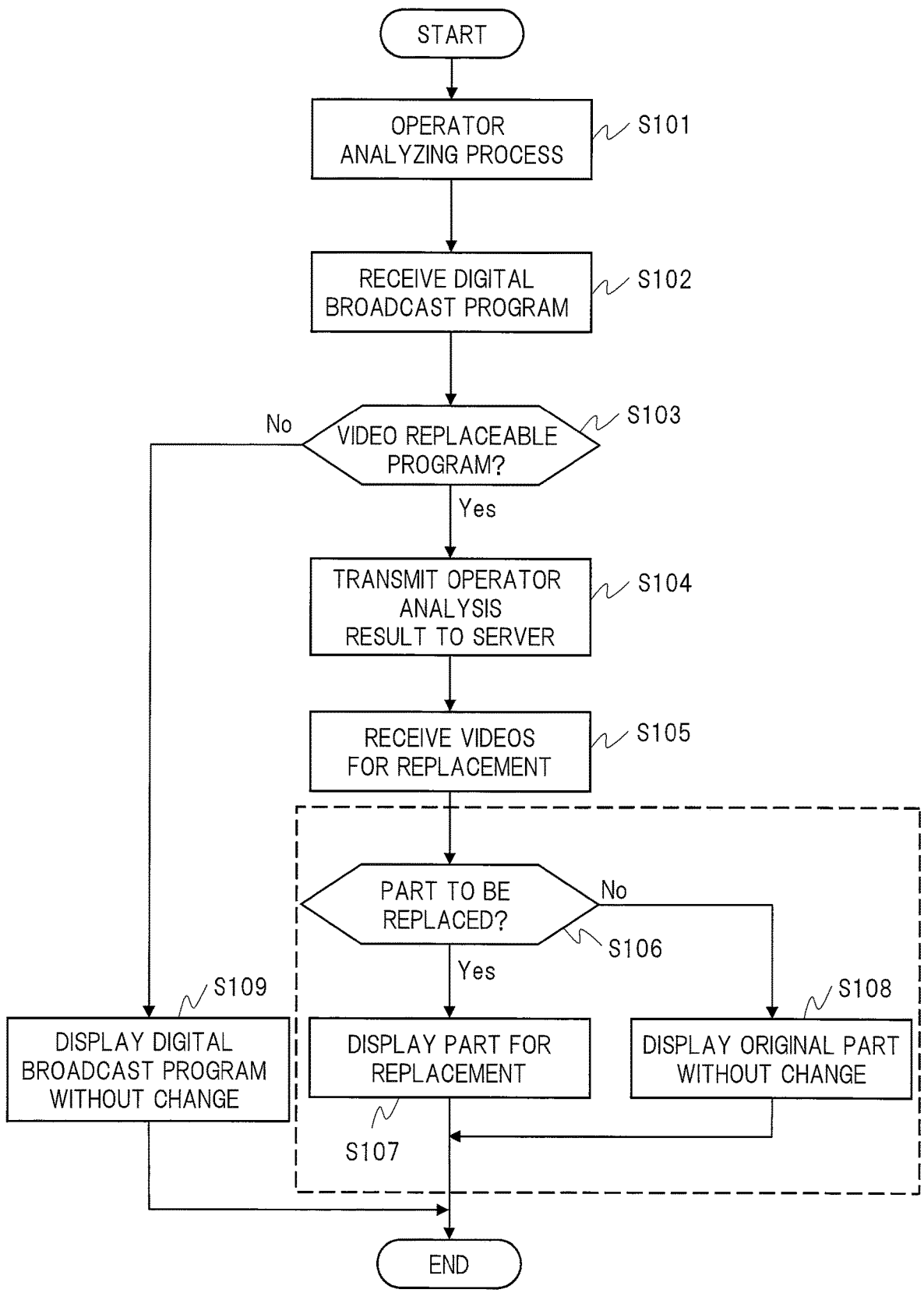
FIG. 9 is a flowchart for describing a video contents selecting process carried out in accordance with the result of the operator analyzing process.
Figure 10:
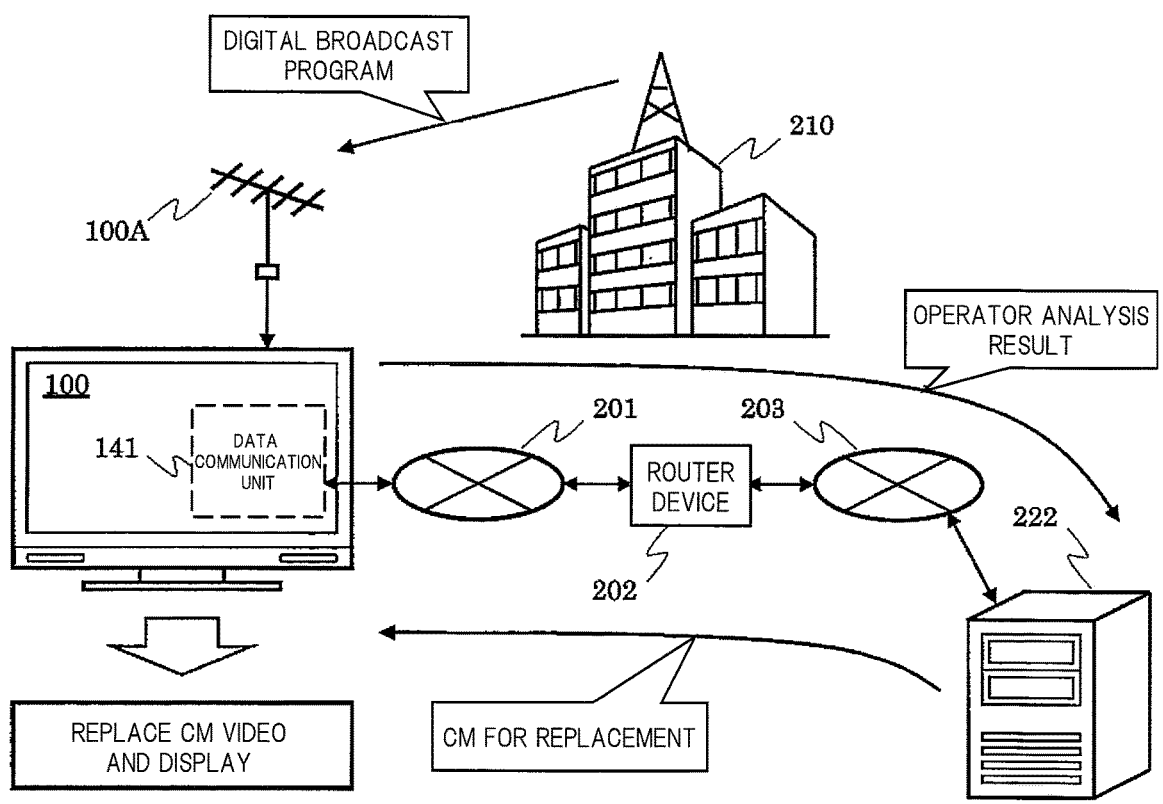
FIG. 10 is a conceptual diagram for describing a video contents selecting process carried out in accordance with the result of the operator analyzing process.

The video display device 100 of the present embodiment further carries out a process of selecting video contents in accordance with the gender and/or age of the operator estimated or confirmed in the above-described operator analyzing process and a process of displaying the selected video contents. FIG. 9 is a flowchart for describing the process of selecting and displaying video contents in accordance with the result of the operator analyzing process of the video display device 100 of the present embodiment. Hereinafter, an example of the case in which general-target CM videos of a digital broadcast program broadcasted by the broadcasting station 210 are replaced and CM videos which are acquired from the CM server 222 in accordance with the result of the operator analyzing process and are suitable for the operator are displayed as shown in FIG. 10 will be described.

In a power-on state, for example, the video display device 100 carries out the above-described operator analyzing process at predetermined time intervals and retains the analysis result thereof on the RAM 104 (S101). Note that, if the viewer (operator) of the video display device 100 is changed, the operator analysis result stored on the RAM 104 is appropriately updated. Furthermore, the video display device 100 receives digital broadcast waves broadcasted from the broadcasting station 210 and selects the digital broadcast program based on an instruction of the viewer (operator) (S102).

Figure 11:
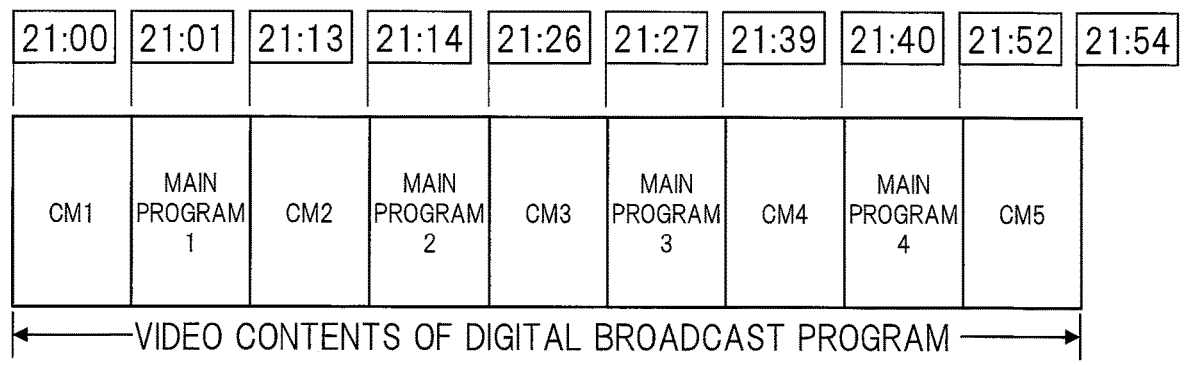
FIG. 11 is a conceptual diagram for describing a configuration of video contents of a digital broadcast program.

Here, the video contents of the digital broadcast program selected by the viewer (operator) include four main program parts (main programs 1 to 4) and five CM parts (CM 1 to 5) as shown in FIG. 11, and the respective video parts are assumed to be broadcasted by a time schedule shown in FIG. 11. Also, the program information of the digital broadcast program is assumed to have information as shown in FIG. 12.

The above-described digital broadcast program is assumed to be a program produced by a car manufacturer X Company serving as a sponsor, and the CM videos of products sold by the car manufacturer X Company are assumed to be broadcasted in the above-described five CM parts. As shown in a list in FIG. 13, it is assumed that the car manufacturer X Company manufactures and sells three types of sedans, three types of sports cars, one type of vans and three types of compact cars and prepares the CM videos respectively targeting customer types shown in the list in FIG. 13. Moreover, it is assumed that a CM video for improving the brand image of the company rather than advertising individual car models is further prepared. Each of the above-described CM videos is supplied to the broadcasting station 210 and stored in the video storage unit 2102 of the CM server 222.

In S102, the video display device 100, which has selected the digital broadcast program which the viewer (operator) desires to view, then acquires program information of the digital broadcast program from accompanying information data by the information decoder 115. Furthermore, the main control unit 101 confirms whether the video contents of the above-described digital broadcast program are replaceable or not by referencing the acquired program information (S103).

When the above-described program information of the digital broadcast program is that shown in FIG. 12, according to the descriptions thereof, the main control unit 101 confirms that a video part of the video contents of the above-described digital broadcast program is partially replaceable and confirms the temporal position of the replaceable part and the URL (Uniform Resource Locator) of a server which stores the videos for replacement. In this case, based on the above-described confirmed information, the main control unit 101 transmits the operator analysis result stored in the RAM 104 to the CM server 222 via the data communication unit 141 and requests the CM server 222 to transmit the videos for replacement (CM videos) (S104). The CM videos for replacement transmitted from the CM server 222 in response to the transmission request of the videos for replacement are received by the data communication unit 141 and stored in the contents temporary memory region 151 of the storage unit 150 or in the RAM 104 (S105).

Note that, in the CM server 222, the operator analysis result and the transmission request of the videos for replacement transmitted from the video display device 100 are received by the communication I/F 2101 by the control of the control unit 2103. Furthermore, in response to the above-described received transmission request of the videos for replacement, the CM videos suitable for the viewer (operator) of the video display device 100 based on the above-described operator analysis result are selected from a group of CM videos stored in the video storage unit 2102, and are transmitted to the video display device 100 via the communication I/F 2101.

Also, the display processing unit 122 sequentially displays the video parts (main program parts and CM parts) of the video contents of the above-described digital broadcast program, which has been received and selected in S102, on the display unit 121. At the same time, the main control unit 101 compares time elapse information acquired from the accompanying information data by the information decoder 115 with the information of the temporal position of the replaceable video part confirmed from the program information of the above-described digital broadcast program in S103, thereby determining whether the video part to be displayed next on the display unit 121 is to be replaced or not (S106).

If the video part to be displayed next on the display unit 121 is to be replaced as a result of the determination in S106, the main control unit 101 reads the CM videos for replacement stored in the contents temporary memory region 151 or in the RAM 104, carries out a decoding process or the like in accordance with needs, and displays the videos on the display unit 121 via the display processing unit 122 (S107). On the other hand, if the video part to be displayed next on the display unit 121 is not to be replaced, the original video part contained in the video contents of the above-described digital broadcast program received from the broadcasting station 210 is directly displayed on the display unit 121 via the display processing unit 122 (S108).

Note that, in the flowchart shown in FIG. 9, the process of S106 to S108 surrounded by a broken line is repeated until the processes to all the video parts contained in the video contents of the above-described digital broadcast program are finished.

Figures 13, 14:
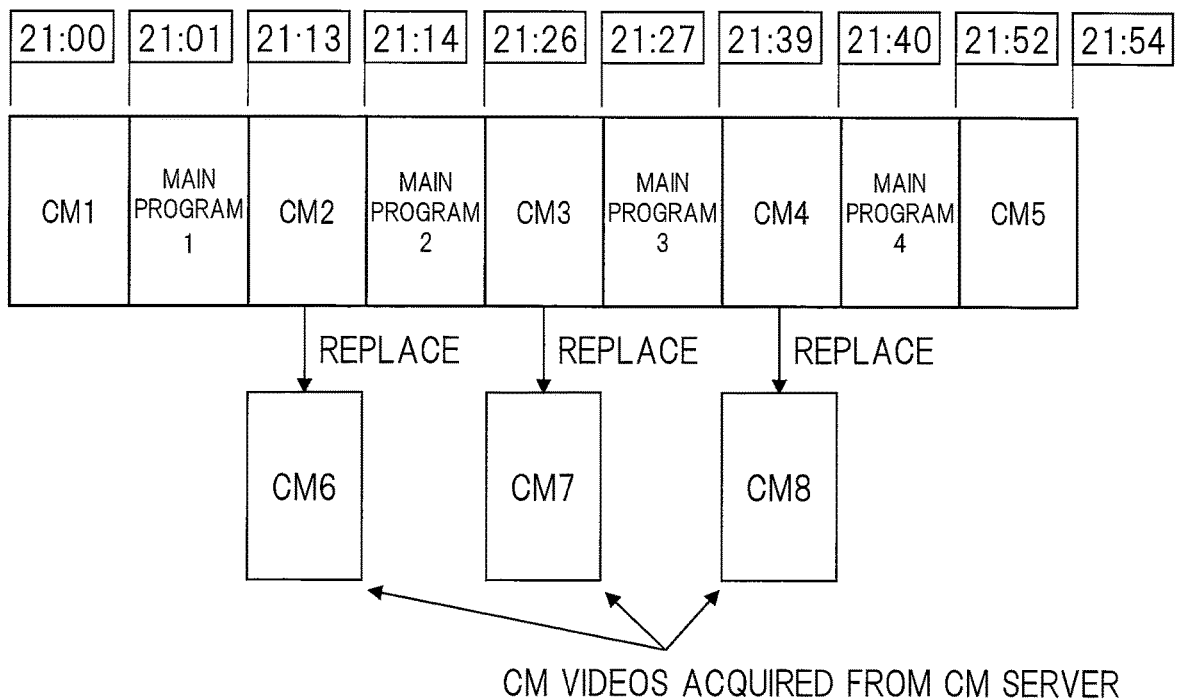
FIG. 13 is a conceptual diagram for describing the types of CM videos prepared by a sponsor company and customer types serving as targets.
FIG. 14 is a conceptual diagram for describing a replacing process of video parts.

FIG. 14 shows the result of carrying out the respective processes of the flowchart of FIG. 9 in the case where the original configuration of the video contents of the digital broadcast program selected by the viewer (operator) is that shown in FIG. 11 and the program information of the above-described digital broadcast program is that shown in FIG. 12. As shown in FIG. 14, the "CM 1" part, the "main programs 1 to 5" parts and the "CM 5" part are displayed without change on the display unit 121 by the determination process in S106. On the other hand, the "CM 2 to 4" parts are replaced by "CM 6 to 8" parts, which have been acquired from the CM server 222 and stored in the contents temporary memory region 151 or in the RAM 104, and the "CM 6 to 8" parts are displayed on the display unit 121.

Note that, for the above-described "CM 6 to 8" parts, CM videos suitable for the viewer (operator) of the video display device 100 are selected in the CM server 222 in accordance with the operator analysis result.

For example, as shown in FIG. 15, when the viewer (operator) of the video display device 100 is the person A (400a) and the gender/age of the person A (400a) are estimated to be "male"/"40 to 49 years old" by the operator analyzing process, the CM server 222 selects "CM SE B" (CM videos for advertising a sedan type B), "CM SP A" (CM videos for advertising a sports car A) and "CM VA" (CM videos for advertising a van) as the "CM 6 to 8" parts, respectively. Moreover, when the above-described viewer (operator) is a person B (400b), "CM SE C" (CM videos for advertising a sedan type C), "CM VA" (CM videos for advertising a van) and "CM CO B" (CM videos for advertising a compact car B) are selected; when the above-described viewer (operator) is a person C (400c), "CM SP B" (CM videos for advertising a sports car B), "CM CO A" (CM videos for advertising a compact car A) and "CM CO C" (CM videos for advertising a compact car C) are selected; and when the above-described viewer (operator) is a person D (400d), "CM SP C" (CM videos for advertising a sports car C), "CM CO B" (CM videos for advertising a compact car B) and "CM CO C" (CM videos for advertising a compact car C) are selected, respectively. If there are a plurality of viewers (operators) of the video display device 100, for example, "CM VA" (CM videos for advertising a van), "CM CO C" (CM videos for advertising a compact car C) and "CM COMPANY" (CM videos for improving the company image), which are the CM videos having no limitation in the gender and ages, are suitably selected.

If it has been confirmed in the process of S103 that the video contents of the above-described digital broadcast program are not replaceable or if an effective operator analysis result cannot be obtained in the operator analyzing process of S101 (for example, if the operator analyzing process fails), the main control unit 101 sequentially displays the video parts (main program parts and CM parts) of the video contents of the above-described digital broadcast program, which has been received/selected from the broadcasting station 210 in S102 without change on the display unit 121 via the display processing unit 122 (S109).

Through the processes above, the video display device 100 of the present embodiment can carry out the process of selecting the video contents suitable for the viewer (operator) of the video display device 100 in accordance with the gender and age of the operator estimated or confirmed in the operator analyzing process and the process of displaying the above-described selected video contents.

Second Embodiment

Hereinafter, a second embodiment of the present invention will be described. Note that the configurations, effects and others of the present embodiment which are not described below are assumed to be similar to those of the first embodiment. Therefore, the points different between the present embodiment and the first embodiment will be mainly described below, and the descriptions of common points will be omitted in order to avoid redundancy.

Figure 16:
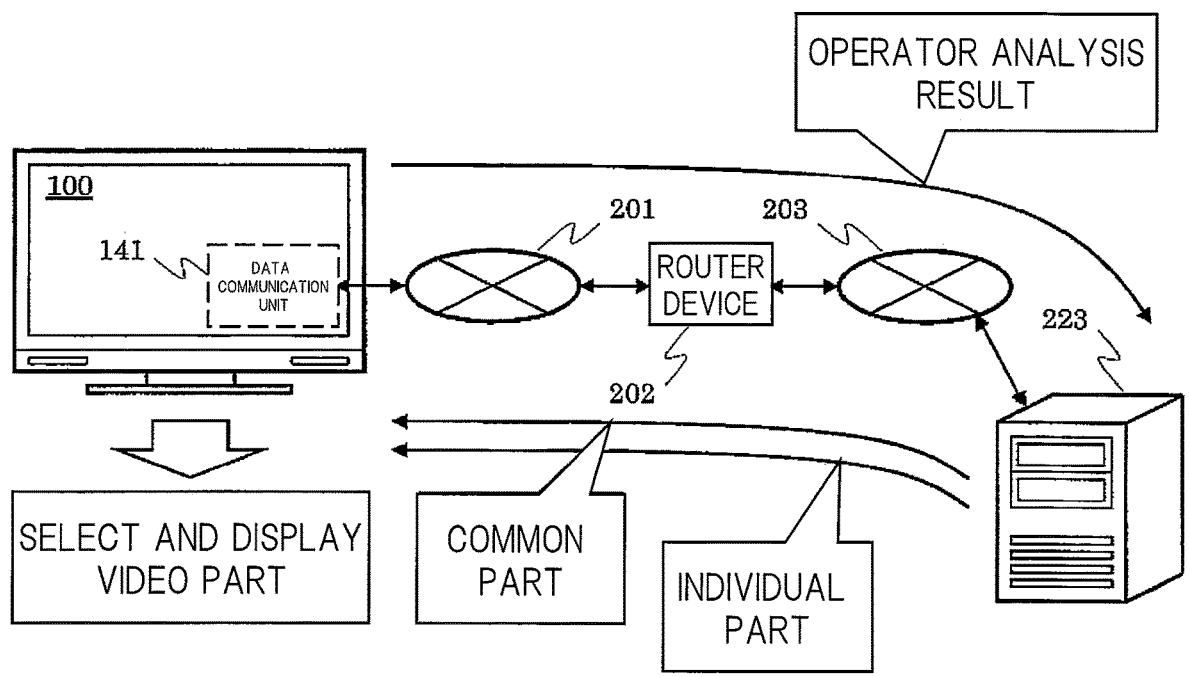
FIG. 16 is a conceptual diagram for describing a video contents selecting process carried out in accordance with the result of the operator analyzing process.
Figure 17:
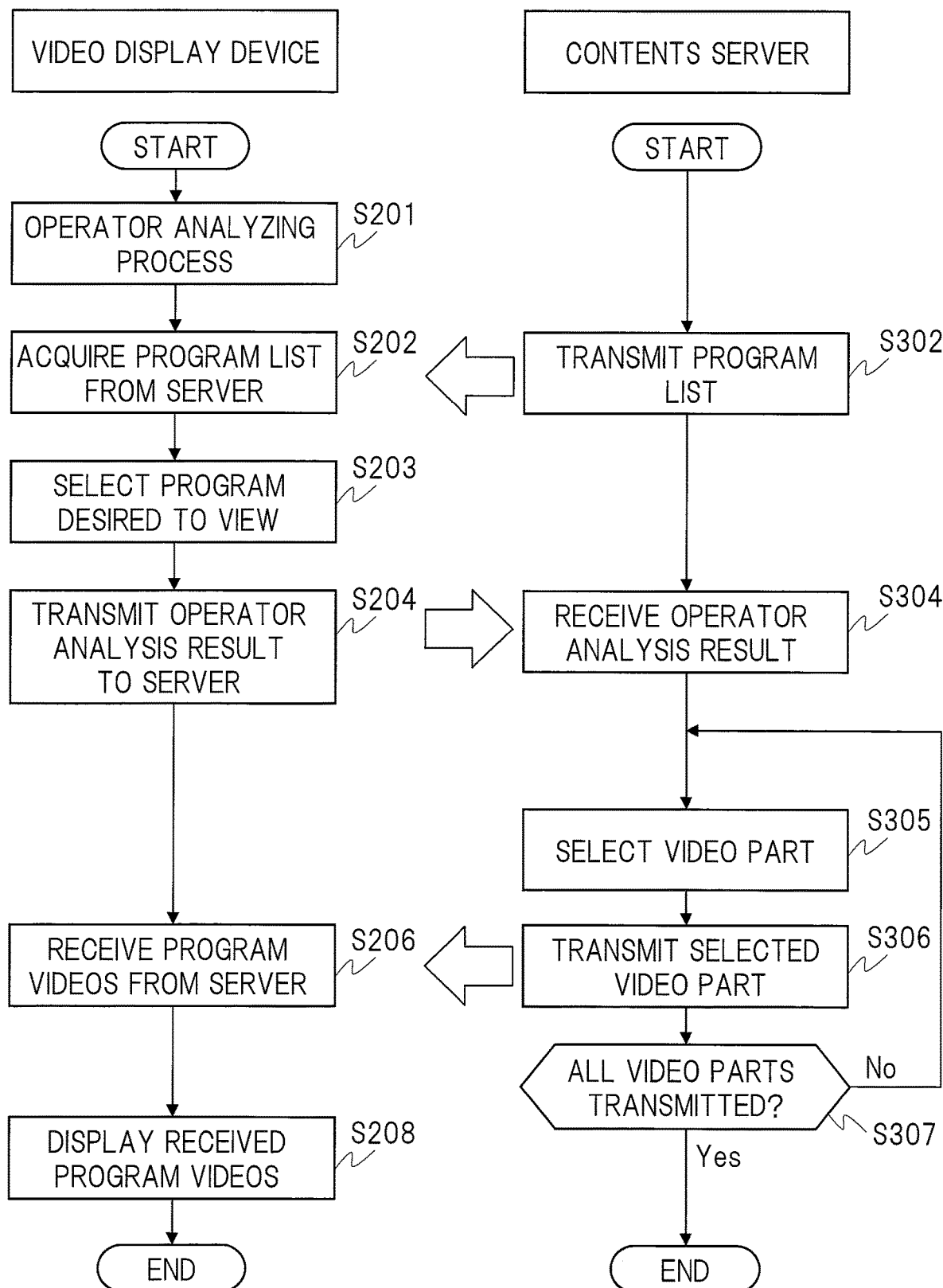
FIG. 17 is a flowchart for describing the video contents selecting process carried out in accordance with the result of the operator analyzing process.

FIG. 16 shows a system configuration example in the present embodiment. In the configuration of FIG. 16, the video display device 100 can appropriately select and acquire the video contents of a streaming program, which are accumulated by the contents server 223, in accordance with the result of the operator analyzing process and display the video contents as a contents configuration suitable for the operator of the video display device 100 on the display unit 121. FIG. 17 shows a flowchart for describing operations of the video display device 100 and the contents server 223 of the present embodiment, in which selection and display of the video contents are carried out in accordance with the result of the operator analyzing process.

In a power-on state, for example, the video display device 100 carries out the operator analyzing process at every predetermined time interval and retains the analysis result thereof on the RAM 104 (S201). Note that, also in the present embodiment, processes similar to those of the above-described first embodiment are carried out for the operator analyzing process. Moreover, if the viewer (operator) of the video display device 100 is changed, the operator analysis result stored on the RAM 104 is appropriately updated.

When the viewer (operator) of the video display device 100 starts to view a streaming program accumulated in the video storage unit 2102 of the contents server 223, in accordance with an operation instruction of the above-described viewer (operator), the main control unit 101 requests the contents server 223 to transmit a streaming program list via the data communication unit 141. The contents server 223, which has received the above-described transmission request of the streaming program list by the communication I/F 2101, transmits the streaming program list to the video display device 100 via the communication I/F 2101 in response to the request (S302). The main control unit 101 acquires the streaming program list, which has been transmitted from the contents server 223, via the data communication unit 141 (S202).

The streaming program list acquired in S202 is displayed on the display unit 121. The above-described viewer (operator) selects the streaming program, which the viewer desires to view, from the streaming program list displayed on the display unit 121 and instructs the reproduction of the above-described selected streaming program (S203). In accordance with the above-described instruction, the main control unit 101 transmits the operator analysis result stored in the RAM 104 to the contents server 223 via the data communication unit 141 and requests the contents server 223 to transmit the above-described selected streaming program (S204). On the other hand, the contents server 223 receives the above-described transmitted operator analysis result and the above-described request to transmit the selected streaming program by the communication I/F 2101 (S304).

Herein, the video contents of each of the streaming programs accumulated in the video storage unit 2102 of the contents server 223 are made up of one or a plurality of video parts, and some or all of the video parts are configured to be selectable in accordance with the result of the operator analyzing process. For example, as shown in FIG. 18, the video contents of the streaming program selected in S203 are made up of five video parts, and "video part 3" and "video part 5" are configured to be selectable from three video parts in accordance with the result of the operator analyzing process.

Each of the video parts constituting the video contents of the streaming program may be independent from each other or may be mutually relevant to each other. For example, in the video contents of the streaming program shown in FIG. 18, "video part 1" is a CM video by a sponsor company, and "video parts 2 to 5" constitute one episode of a drama.

In accordance with the transmission request of the streaming program received in S304, based on an instruction of the control unit 2103, the contents server 223 selects the video parts of the video contents of the above-described selected streaming program based on the operator analysis result received in S304 (S305) and transmits them to the video display device 100 via the communication I/F 2101 (S306). Note that the process of selecting and transmitting the above-described video parts are repeated until the processes to all of the video parts of the video contents of the above-described selected streaming program are finished (S307).

Figures 18, 19:
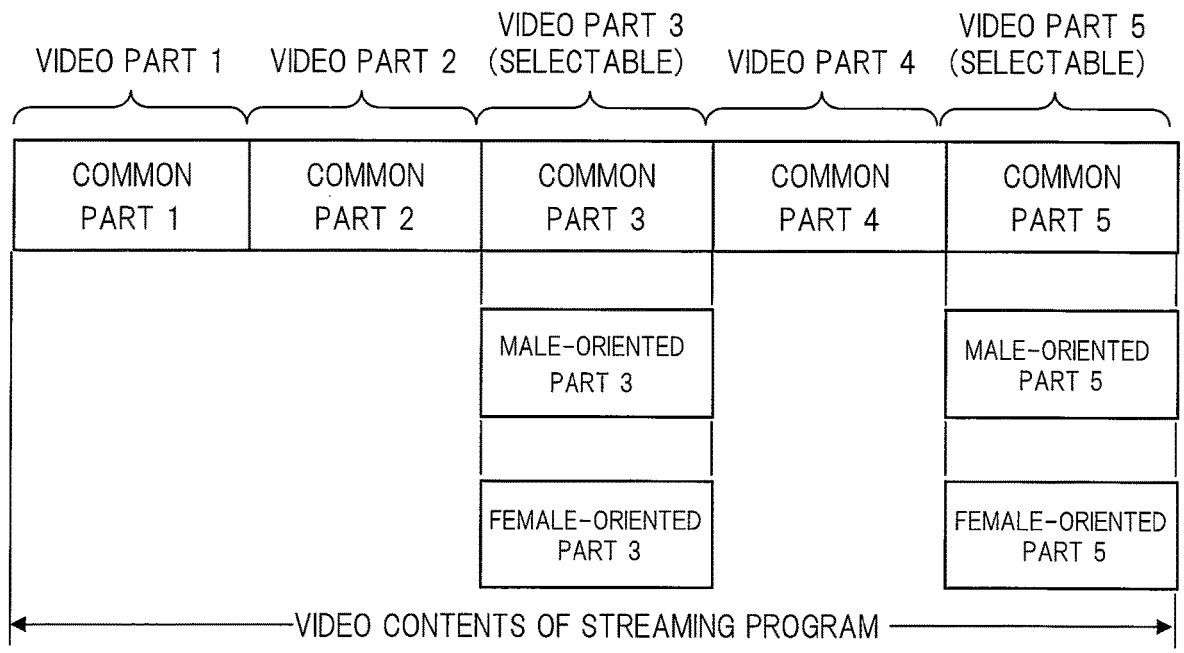
FIG. 18 is a conceptual diagram for describing a configuration of video contents of a streaming program.
FIG. 19 is a conceptual diagram for describing a video selection result obtained by the video contents selecting process carried out in accordance with the result of the operator analyzing process.

For example, as shown in FIG. 19, when the viewer (operator) of the video display device 100 is a person E (400*e*) and the gender of the person E (400*e*) is estimated to be "male" by the operator analyzing process, the contents server 223 selects the video parts of "common parts 1 to 2", "male-oriented part 3", "common part 4" and "male-oriented part 5" and transmits them to the video display device 100. Also, when the viewer (operator) is a person F (400*f*), the video parts of "common parts 1 to 2", "female-oriented part 3", "common part 4" and "female-oriented part 5" are selected and transmitted. If the viewers (operators) of the video display device 100 are a mixture of males and females or if there is no transmission of the operator analysis result from the video display device 100, the contents server 223 selects "common parts 1 to 5" which are the video parts having no limitation in the gender.

The video parts transmitted from the contents server 223 in S306 are received by the data communication unit 141 and are stored in the contents temporary memory region 151 of the storage unit 150 or in the RAM 104 (S206). Furthermore, the main control unit 101 reads the video contents of the above-described streaming program, which are stored in the contents temporary memory region 151 or in the RAM 104, carries out a decoding process in accordance with needs, and displays them on the display unit 121 (S208).

Note that the process of displaying the video contents of the streaming program on the display unit 121 in S208 is not necessarily started after all of the processes of storing the video parts transmitted from the contents server 223 in the contents temporary memory region 151 or in the RAM 104 in S206 are finished, and the processes may be appropriately carried out in parallel.

Through the processes above, the video display device 100 and the contents server 223 of the present embodiment can carry out the selecting process and the displaying process of the video contents suitable for the viewer (operator) of the video display device 100 in accordance with the gender of the operator estimated or confirmed in the operator analyzing process. More specifically, even when the same streaming program accumulated in the contents server 223 is selected, males can enjoy the streaming program whose contents configuration is arranged for males and females can enjoy the streaming program whose contents configuration is arranged for females with the video display device 100.

Third Embodiment

Hereinafter, a third embodiment of the present invention will be described. Note that the configurations, effects and others of the present embodiment which are not described below are assumed to be similar to those of the second embodiment. Therefore, the points different between the present embodiment and the second embodiment will be mainly described below, and the descriptions of common points will be omitted in order to avoid redundancy.

The video display device 100 and the contents server 223 of the present embodiment also operate along the flowchart shown in FIG. 17 like the second embodiment. However, in the video display device 100 of the present embodiment, as shown in FIG. 8, the operator analyzing process is carried out by communication with the mobile information terminal 300. Moreover, in the internal memory (not shown) of the mobile information terminal 300, for example, information about preferences can also be registered in addition to the gender and age as personal information of the person who owns the mobile information terminal 300. For example, if the person who owns the mobile information terminal 300 enjoys cars as a hobby, a keyword such as "car" is suitably registered as the above-described information about preferences.

In the process of S201, the video display device 100 carries out the above-described operator analyzing process at every predetermined time interval and retains the analysis result thereof on the RAM 104. Note that, in the present embodiment, the above-described analysis result (operator analysis result) is the information about the gender and preferences of the person who owns the mobile information terminal 300.

Moreover, when the viewer (operator) of the video display device 100 starts to view a streaming program accumulated in the video storage unit 2102 of the contents server 223, the main control unit 101 requests the contents server 223 to transmit a streaming program list via the data communication unit 141 in accordance with an operation instruction of the above-described viewer (operator). At this time, the main control unit 101 transmits the above-described information about preferences together. The contents server which has received the above-described transmission request of the streaming program list and the above-described information about preferences transmits the streaming program list to the video display device 100 in response to the above-described request in the process of S302.

However, the streaming program list transmitted by the contents server 223 of the present embodiment in the process of S302 is a list of the video contents selected based on the above-described received information about the preferences of the person who owns the mobile information terminal 300 instead of the list of all the video contents stored in the video storage unit 2102 of the contents server 223.

For example, when the person who owns the mobile information terminal 300 has registered a keyword such as "car" in the internal memory (not shown) of the mobile information terminal 300 as the information about the preferences of himself/herself, the contents server 223 which has received the above-described information about the preferences from the video display device 100 creates a list by selecting the video contents produced by a car manufacturer (including manufacturers other than above-described X Company) serving as a sponsor, the video contents dealing with other cars and others from all of the video contents stored in the video storage unit 2102 of the contents server 223. As a result, the video contents of the streaming program list displayed on the display unit 121 in S203 are the contents having CM videos of a car manufacturer as "video part 1" or the like.

Thereafter, the processes similar to those of the second embodiment are carried out, so that the viewer (operator) of the video display device 100 can receive only the video contents having the video parts, which have been selected in accordance with the information about the preferences of the operator confirmed in the operator analyzing process and meet the above-described preferences, as options for selecting video contents.

Fourth Embodiment

Hereinafter, a fourth embodiment of the present invention will be described. Note that the configurations, effects and others of the present embodiment which are not described below are assumed to be similar to those of the second embodiment. Therefore, the points different between the present embodiment and the second embodiment will be mainly described below, and the descriptions of common points will be omitted in order to avoid redundancy.

Figures 20, 21:
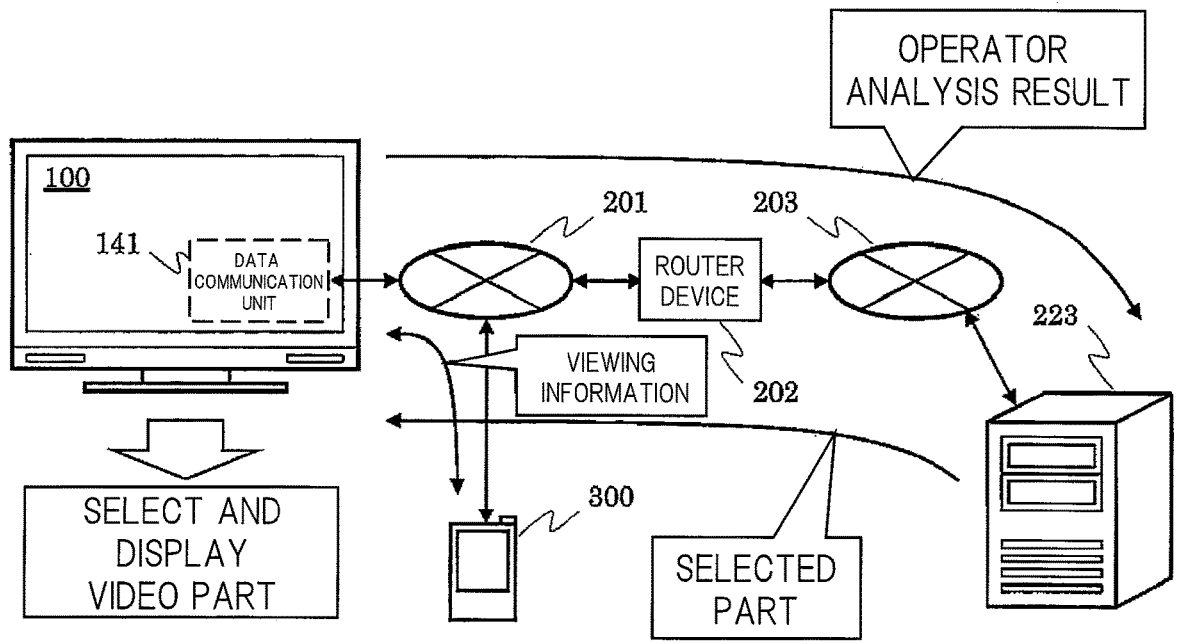
FIG. 20 is a conceptual diagram for describing the video contents selecting process carried out in accordance with the result of the operator analyzing process.
FIG. 21 is a conceptual diagram for describing the video selection result obtained by the video contents selecting process carried out in accordance with the result of the operator analyzing process.

FIG. 20 shows a system configuration example of the present embodiment. In the video display device 100 of the present embodiment, when a viewer (operator) views a streaming program accumulated in the video storage unit 2102 of the contents server 223, the information including a file name and the number of times of views of the above-described streaming program (hereinafter, referred to as streaming viewing information) is stored in the internal memory (not shown) of the mobile information terminal 300 as shown in FIG. 20. Note that the location for storing the above-described streaming viewing information may be the individual information memory region 152 of the storage unit 150 other than the above-described internal memory (not shown) of the mobile information terminal 300.

Moreover, the video display device 100 of the present embodiment is configured to carry out the operator analyzing process by communication with the mobile information terminal 300. First, the operator analyzing unit 133 requests the mobile information terminal 300, which is owned by the viewer (operator) of the video display device 100, to transmit the above-described streaming viewing information via the data communication unit 141. In response to the above-described request transmitted from the video display device 100, the mobile information terminal 300 transmits the above-described streaming viewing information, which is stored in the internal memory (not shown), to the video display device 100. The operator analyzing unit 133 carries out an operator analyzing process of understanding the viewing status (history) of the streaming program by the viewer (operator) of the video display device 100 by referencing the above-described streaming viewing information transmitted from the mobile information terminal 300.

The video display device 100 and the contents server 223 of the present embodiment also carry out the processes of selecting and displaying the video contents in accordance with the result of the operator analyzing process by the operations approximately similar to those of the flowchart shown in FIG. 17.

However, in the process of transmitting the operator analysis result in S204, the data about the above-described streaming viewing information is transmitted instead of the result of estimating/confirming the gender of the viewer (operator) of the video display device 100. More specifically, the operator analyzing unit 133 searches the above-described streaming viewing information for the file name of the streaming program, which the viewer (operator) has selected in S203, thereby confirming whether the viewer (operator) of the video display device 100 has viewed the same streaming program in the past or not and confirming the number of times of views thereof if the viewer has viewed it in the past. Furthermore, the above-described confirmation result is transmitted to the contents server 223 via the data communication unit 141 together with a transmission request of the above-described selected streaming program.

Moreover, in response to the above-described transmission request of the streaming program, the contents server 223 selects and transmits the video parts of the video contents of the above-described selected streaming program based on the above-described confirmation result transmitted from the video display device 100. In the present embodiment, for example, when the above-described viewer (operator) has never viewed the above-described selected streaming program in the past as shown in FIG. 21, the contents server 223 selects "common part 3" and "common part 5" as "video part 3" and "video part 5", respectively. Also, when the number of times of views of the above-described selected streaming program in the past is one, "male part 3" and "male part 5" are selected, and when the number of times of views in the past is two, "female part 3" and "female part 5" are suitably selected.

Furthermore, the contents server 223 may operate so as to select only "video parts 1 to 3" and does not select "video parts 4 to 5" when the above-described viewer (operator) has never viewed the above-described selected streaming program in the past, select only "video parts 1 to 4" and does not select "video part 5" when the number of times of views in the past is one, and select all of the video parts of "video parts 1 to 5" when the number of times of views in the past is two.

Through the processes above, the video display device 100 and the contents server 223 of the present embodiment can carry out the processes of selecting and displaying the video contents suitable for the viewer (operator) of the video display device 100 in accordance with the past streaming-program viewing history of the operator confirmed in the operator analyzing process. More specifically, even when the same streaming program accumulated in the contents server 223 is selected, the viewer can enjoy a scenario arranged into a different contents configuration every time depending on the number of times of views in the past.

Hereinabove, the examples of the embodiments of the present invention have been described based on the first to fourth embodiments. Note that the configurations that realize the techniques of the present invention are not limited to the above-described embodiments. For example, the configuration of a certain embodiment may be combined with the configuration of another embodiment. Specifically, instead of displaying the above-described digital broadcast program and the above-described video contents on the display unit 121 of the video display device 100 like the above-described embodiments, the above-described digital broadcast program and the above-described video contents may be displayed on the display unit of the mobile information terminal 300 by transmitting the output of the display processing unit 122 to the mobile information terminal 300 via the data communication unit 141. All of these belong to the range of the present invention. Also, the numerical values, texts of messages and others which appear in documents and drawings are merely examples, and the effects of the present invention are not impaired even when different ones are used.

Also, some or all of the above-described functions and others of the present invention may be implemented by hardware by designing them with integrated circuits or the like. Also, they may be implemented by software by interpreting and executing programs for implementing the respective functions by processors. The above-described programs may be preliminarily stored in the ROM 103 of the video display device 100 or the other information memory region 154 and the like in the storage unit 150, or may be acquired from the application server 221 on the Internet via the data communication unit 141. Alternatively, the above-described programs stored in a memory card may be acquired via the USB interface 163.

Furthermore, only the control lines and information lines required in terms of description are illustrated in the drawings, and all control lines and information lines in products are not necessarily illustrated. In practice, it is right to think that almost all configurations are connected to one another.

DESCRIPTION OF REFERENCE CHARACTERS

100: VIDEO DISPLAY DEVICE, 100A: ANTENNA, 101: MAIN CONTROL UNIT, 102: SYSTEM BUS, 103: ROM, 104: RAM, 110: BROADCAST RECEIVING UNIT, 111: TUNER, 112: SEPARATION UNIT, 113: VIDEO DECODER, 114: AUDIO DECODER, 115: INFORMATION DECODER, 121: DISPLAY UNIT, 122: DISPLAY PROCESSING UNIT, 123: SPEAKER, 124: AUDIO PROCESSING UNIT, 130: OPERATOR INFORMATION ACQUIRING UNIT, 131: VIDEO INPUT UNIT, 132: AUDIO INPUT UNIT, 133: OPERATOR ANALYZING UNIT, 141: DATA COMMUNICATION UNIT, 150: STORAGE UNIT, 151: CONTENTS TEMPORARY MEMORY REGION, 152: INDIVIDUAL INFORMATION MEMORY REGION, 153: PROGRAM RECORDING REGION, 154: OTHER INFORMATION MEMORY REGION, 160: EXTERNAL INTERFACE, 161: VIDEO INTERFACE, 162: AUDIO INTERFACE, 163: USB INTERFACE, 170: OPERATION UNIT, 171: OPERATION KEY, 172: REMOTE-CONTROL RECEIVING UNIT, 201: LAN, 202: ROUTER DEVICE, 203: WAN, 210: BROADCASTING STATION, 221: APPLICATION SERVER, 222: CM SERVER, 223: CONTENTS SERVER, 224: OPERATOR ANALYZING SERVER, 300: MOBILE INFORMATION TERMINAL, 400: VIEWER (OPERATOR), 2100: CM SERVER AND CONTENTS SERVER, 2101: COMMUNICATION I/F, 2102: VIDEO STORAGE UNIT, 2103: CONTROL UNIT

The invention claimed is:

1. A method of displaying contents on a video display apparatus,
the method comprising:
transmitting and receiving information to and from a server configured to distribute contents;
transmitting analysis information of an operator who operates the video display apparatus to the server;
receiving content list information transmitted from the server and displaying the content list information on the display;
selecting content to be reproduced from the displayed content list information by the operator;
transmitting a transmission request of the selected content to the server;
receiving the selected content transmitted from the server in response to the transmission request of the selected content and the analysis information of the operator from the video display apparatus; and
displaying the selected content on the display;
wherein the selected content stored in the server is divided into two or more main program video parts different from an advertisement video,
wherein the main program video parts include one or more first video parts composed of fixed video data regardless of a number of views of the selected content based on the analysis information of the operator transmitted from the video display apparatus and one or more second video parts whose video data is changed depending on the number of views of the selected content based on the analysis information of the operator transmitted from the video display apparatus, and
wherein, in response to the transmission request of the selected content from the video display apparatus to the server, the server transmits the fixed video data as it is to the video display apparatus when transmitting the first video parts for the main program, and the server selects, as video data of the second video parts, one video data in the plurality of selectable video data in accordance with the number of views of the selected content based on the analysis information of the operator transmitted from the video display apparatus when transmitting the second video parts for the main program, and transmits the selected video data to the video display apparatus.

2. The method of displaying content on the video display apparatus according to claim 1, further comprising transmitting and receiving information configured to communicate with a mobile information terminal that an operator who operates the video display apparatus possesses, wherein the analysis information of the operator transmitted from the video display apparatus to the server is based on information received from the mobile information terminal that the operator who operates the video display apparatus possesses.

* * * * *